United States Patent Office 3,246,010
Patented Apr. 12, 1966

3,246,010
1,5-DIARYL-2-PYRROLE PROPANOLS AND ETHERS
Paul L. Creger, Ann Arbor, Mich., assignor to Parke, Davis & Company, Detroit, Mich., a corporation of Michigan
No Drawing. Filed June 10, 1963, Ser. No. 286,515
5 Claims. (Cl. 260—326.5)

The present invention relates to novel heterocyclic compounds and to methods for their production. More particularly, it relates to 1,2,5-trisubstituted-pyrrole compounds having the formula

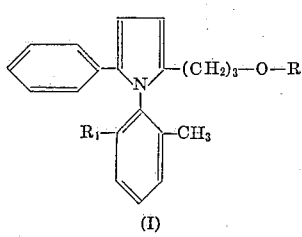

(I)

where each of R and $R_1$ is hydrogen or methyl.

In accordance with the invention, 1,5-diarylpyrrole-2-propanol compounds having the formula

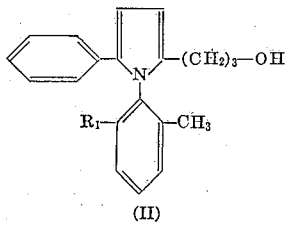

(II)

are produced by the reduction of compounds of the formula

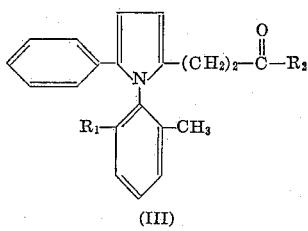

(III)

in an anhydrous organic solvent medium, followed by decomposition of the reaction mixture with an aqueous medium; where $R_1$ has the aforementioned significance and $R_2$ is hydroxyl, lower alkoxy, or halogen, preferably chlorine. The preferred reducing agent is lithium aluminum hydride, since its use results in the efficient reduction of all of the compounds of Formula III. Other reducing agents which may also be used, depending on the nature of the $R_2$ group in the compounds of Formula III, are metallic sodium in a lower aliphatic alcohol, such as ethanol, and sodium borohydride and other complex metal hydrides. Suitable solvents for use with lithium aluminum hydride are anhydrous inert ethers, such as diethyl ether, tetrahydrofuran, dibutyl ether, 1,2-dimethoxyethane, and diethylene glycol dimethyl ether. The preferred solvent for reduction of the compounds where $R_2$ is lower alkoxy or halogen is diethyl ether. A higher-boiling solvent, such as tetrahydrofuran or 1,2-dimethoxyethane, is preferred for reduction of the compounds where $R_2$ is hydroxyl. The preferred solvents for use with sodium borohydride are the lower aliphatic alcohols, such as methanol and ethanol. The temperature for the reduction may be varied over a wide range from 0° to 100° C.; for best results the reflux temperature of the solvent is employed. The duration of the reaction may vary from several minutes to several hours, depending on the temperature; it is preferable to carry out the reduction during a period of 30–60 minutes at the reflux temperature of the solvent employed. Equivalent amounts of reactants may be used; in normal practice, however, an excess of reducing agent is employed. Following reaction with the reducing agent, the reaction mixture is decomposed with an aqueous medium, such as water, dilute aqueous inorganic acids or bases, or other media containing water.

The compounds of Formula III used as starting materials in the foregoing process are prepared in a number of ways. The starting materials where $R_2$ is hydroxyl are prepared by reacting 6-benzoyl-4-oxohexanoic acid with amine compounds having the formula

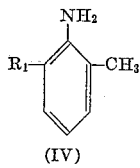

(IV)

where $R_1$ is as defined previously. The starting materials where $R_2$ is lower alkoxy can be prepared by reacting the compounds of Formula III where $R_2$ is hydroxyl with a lower aliphatic alcohol in the presence of an acid catalyst. The starting materials where $R_2$ is halogen can be prepared by treating the compounds of Formula III where $R_2$ is hydroxyl with a suitable inorganic acid halide, such as thionyl chloride, phosphorus tribromide, or phosphorus oxychloride.

Also in accordance with the invention, 1,5-diaryl-2-(3-methoxypropyl)-pyrrole compounds having the formula

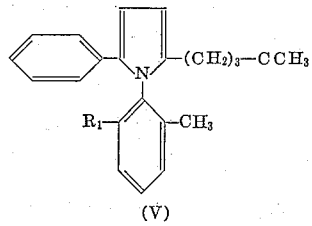

(V)

are produced by the reaction of 1,5-diarylpyrrole-2-propanol compounds of Formula II or reactive derivatives thereof with a methylating agent. Reactive derivatives of the alcohols of Formula II which may be used include aliphatic and aromatic sulfonate esters. Suitable methylating agents for use in this reaction include alkali metal methoxides, dimethyl sulfate, and diazomethane. The preferred methylating agent is an alkali metal methoxide, such as sodium methoxide, which is preferably reacted with the methanesulfonate ester of the 1,5-diarylpyrrole-2-propanol compounds of Formula II in methanol. The temperature of this etherification reaction may be varied over a wide range from 0° to 100° C.; it is most convenient to carry out the reaction at the reflux temperature of the methanol solvent. The reaction may be carried out over a period of 1 to 16 hours, depending on the temperature employed; at the reflux temperature the reaction is normally complete in 2–4 hours. At least one mole of alkali metal methoxide per mole of sulfonate ester is required. In normal practice it is preferable to employ a four- to six-fold excess of alkali metal methoxide.

The sulfonate esters used as starting materials in the foregoing process are prepared by the reaction of the 1,5-diarylpyrrole-2-propanol of Formula II with an aliphatic or aromatic sulfonyl chloride in a tertiary base solvent, such as pyridine.

The compounds of the invention are useful as pharmacological agents. They are hypocholesteremic agents of value in reducing the level of blood cholesterol. They are active upon either oral or parenteral administration; oral administration is preferred.

The invention is illustrate by the following examples:

EXAMPLE 1

A solution of 31.9 g. of methyl 1-(o-tolyl)-5-phenylpyrrole-2-propionate in 300 ml. of anhydrous ether is added over a period of 20 minutes to a well-stirred mixture of 2.9 g. of lithium aluminum hydride in 200 ml. of anhydrous ether. The resulting mixture is heated under reflux for 30 minutes, cooled, and decomposed by the successive addition with stirring of 2.9 ml. of water, 2.9 ml. of 15% aqueous sodium hydroxide, and 8.7 ml. of water. The aqueous mixture is purified by filtration, the filtrate is evaporated under reduced pressure, and the oily residue is distilled at reduced pressure to give 1-(o-tolyl)-5-phenylpyrrole-2-propanol; B.P. 150–153° C./0.015 mm. Hg; $n_D^{25}$ 1.6160.

In the foregoing procedure, the same product is obtained when 33.3 g. of ethyl 1-(o-tolyl)-5-phenylpyrrole-2-propionate is substituted for the methyl ester.

The methyl 1-(o-tolyl)-5-phenylpyrrole-2-propionate used as starting material in the procedure above is obtained in the following manner. A solution of 117 g. of 6-benzoyl-4-oxohexanonic acid and 54 g. of o-toluidine in 500 ml. of glacial acetic acid is heated under reflux for 16 hours. Hot water (400 ml.) is added slowly with stirring, and the mixture is cooled slowly to 0–5° C. The 1-(o-tolyl)-5-phenylpyrrole-2-propionic acid which separates is isolated by filtration, washed with water, and dried under reduced pressure; M.P. 145.5–146.5° C. A solution of 61 g. of 1-(o-tolyl)-5-phenylpyrrole-2-propionic acid and 3.0 g. of p-toluenesulfonic acid monohydrate in 300 ml. of absolute methanol is heated under reflux for 5 hours. The excess methanol is evaporated under reduced pressure, and the residue is dissolved in 500 ml. of ether. The ether solution is washed first with two 50-ml. portions of 10% aqueous sodium carbonate, then with 100 ml. of water, and dried over anhydrous magnesium sulfate. The dried solution is evaporated to dryness, and the methyl 1-(o-tolyl)-5-phenylpyrrole-2-propionate obtained is crystallized from methanol; M.P. 69–70.5° C. This ester may also exist in a polymorphic form, M.P. 58–60° C.

Ethyl 1-(o-tolyl)-5-phenylpyrrole-2-propionate, which may also be used as the starting material in the procedure of this example, is obtained in a similar manner by the reaction of 1-(o-tolyl)-5-phenylpyrrole-2-propionic acid with absolute ethanol.

EXAMPLE 2

A solution of 28 g. of ethyl 1-(2,6-xylyl)-5-phenylpyrrole-2-propionate in 200 ml. of anhydrous ether is slowly added to a well-stirred mixture of 2.3 g. of lithium aluminum hydride in 300 ml. of anhydrous ether. The resulting mixture is heated under reflux for 30 minutes, cooled, and decomposed by the successive addition with stirring of 2.3 ml. of water, 2.3 ml. of 15% aqueous sodium hydroxide, and 6.9 ml. of water. The aqueous mixture is purified by filtration, the filtrate is evaporated under reduced pressure, and the oily residue is distilled at reduced pressure to give 1-(2,6-xylyl)-5-phenylpyrrole-2-propanol; B.P. 154–156° C./0.07 mm. Hg; $n_D^{25}$ 1.6138.

In the foregoing procedure, the same product is obtained when the ethyl ester is replaced by 26 g. of 1-(2,6-xylyl)-5-phenylpyrrole-2-propionic acid and the reduction is carried out in 500 ml. of anhydrous 1,2-dimethoxyethane at the reflux temperature for 3 hours.

The 1-(2,6-xylyl)-5-phenylpyrrole-2-propionic acid used as starting material in the above procedure is prepared as follows. A solution of 117 g. of 6-benzoyl-4-oxohexanoic acid and 61 g. of 2,6-dimethylaniline in 500 ml. of glacial acetic acid is heated under reflux for 16 hours. Hot water (400 ml.; 70–80° C.) is added slowly with stirring and the mixture is cooled to 0–5° C. The 1-(2,6-xylyl)-5-phenylpyrrole-2-propionic acid which separates is isolated by filtration, washed with water and dried under reduced pressure; M.P. 148–149° C. after recrystallization from aqueous ethanol.

The acid prepared as described above is converted to the ethyl ester in the following manner. A solution of 31.9 g. of 1-(2,6-xylyl)-5-phenylpyrrole-2-propionic acid and 1.5 g. of p-toluene sulfonic acid monohydrate in 150 ml. of absolute ethanol is heated under reflux for 4 hours. The excess ethanol is evaporated under reduced pressure and the residue is dissolved in 500 ml. of ether. The ether solution is washed first with two 50-ml. portions of 10% aqueous sodium carbonate, then with 100 ml. of water, and dried over anhydrous magnesium sulfate. The solvent is removed from the ether solution under reduced pressure and the residue is distilled at reduced pressure to give ethyl 1-(2,6-xylyl)-5-phenylpyrrole-2-propionate; B.P. 144–146° C./0.07–0.08 mm. Hg; $n_D^{25}$ 1.5855.

EXAMPLE 3

A solution of 18.5 g. of 1-(o-tolyl)-2-phenylpyrrole-5-propylmethanesulfonate and 11.4 g. of 95% sodium methoxide in 250 ml. of methanol is stirred and heated under reflux for 3 hours. The precipitated sodium methanesulfonate is removed by filtration, and the filtrate is evaporated under reduced pressure. The residue is dissolved in 200 ml. of ether, and the ether solution is washed with two 50-ml. portions of water and dried over anhydrous magnesium sulfate. The solvent is removed from the dried solution under reduced pressure, and the residue is distilled at reduced pressure to give 1-(o-tolyl)-2-(3-methoxypropyl)-5-phenylpyrrole as a pale yellow oil, B.P. 130–134° C./0.04 mm. Hg; which crystallizes on standing to a pale yellow solid, M.P. 34–35.5° C.

The 1 - (o - tolyl) - 2 - phenyl - 5 - propylmethanesulfonate used as starting material in the foregoing procedure is prepared in the following manner. To a solution of 10.4 g. of 1-(o-tolyl)-5-phenylpyrrole-2-propanol in 14.1 g. of pyridine maintained at a temperature below 10° C. is added in portions 4.1 g. of methanesulfonyl chloride. The mixture is stirred for 30 minutes at a temperature between —10 and 0° C., and then at room temperature for 90 minutes. A solution of 35 ml. of 6 N sulfuric acid in 50 ml. of water is added with stirring, and the resulting aqueous mixture is extracted with 300 ml. of ether. The ether extract is washed first with 50 ml. of 3 N sulfuric acid, then with 50 ml. of water, and dried over anhydrous magnesium sulfate. The solvent is removed from the dried solution under reduced pressure and the 1-(o-tolyl)-2-phenyl-5-propylmethanesulfonate obtained is crystallized twice from cyclohexane; M.P. 89–90° C.

EXAMPLE 4

A solution of 21.6 g. of 1-(2,6-xylyl)-2-phenylpyrrole-5-propylmethanesulfonate and 12.6 g. of 95% sodium methoxide in 250 ml. of methanol is stirred and heated under reflux for 3 hours. The precipitated sodium methanesulfonate is removed by filtration, and the filtrate is evaporated under reduced pressure. The residual oil is dissolved in 200 ml. of ether, and the ether solution is washed with two 50-ml. portions of water and dried over anhydrous magnesium sulfate. The solvent is removed from the dried solution, and the residue is distilled under reduced pressure to give 1-(2,6-xylyl)-2-(3-methoxypropyl)-5-phenylpyrrole; B.P. 131–135° C./0.04 mm. Hg; $n_D^{25}$ 1.5938.

The 1 - (2,6 - xylyl) - 2 - phenylpyrrole - 5 - propylmethanesulfonate used as starting material in the foregoing procedure is prepared in the following manner. To a solution of 9.15 g. of 1-(2,6-xylyl)-5-phenylpyrrole-2-propanol in 12 g. of pyridine maintained at 0–10° C. is added dropwise with stirring 3.5 g. of methanesulfonyl chloride. The reaction mixture is stirred at room temperature for 2 hours, cooled, and diluted with 30 ml. of 6 N sulfuric acid with stirring. The crystalline 1-(2,6-xylyl) - 2 - phenylpyrrole - 5 - propylmethanesulfonate which separates is isolated, washed with water and dried under reduced pressure; M.P. 69–70° C., after several crystallizations from n-hexane.

I claim:

1. A 1,2,5-trisubstituted-pyrrole compound of the formula

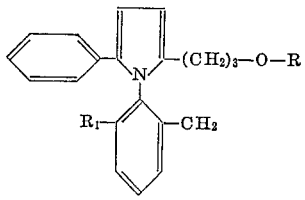

where each of R and $R_1$ is selected from the class consisting of hydrogen and methyl.

2. 1-(o-tolyl)-5-phenylpyrrole-2-propanol.
3. 1-(2,6-xylyl)-5-phenylpyrrole-2-propanol.
4. 1-(o-tolyl)-2-(3-methoxypropyl-5-phenylpyrrole.
5. 1-(2,6-xylyl)-2-(3-methoxypropyl)-5-phenylpyrrole.

References Cited by the Examiner

Noller, Chemistry of Organic Compounds," 1957, pages 137, 162, 172, 288.

Wagnet et al., "Synthetic Organic Chemistry," 1953, pages 228–29.

HENRY R. JILES, *Acting Primary Examiner.*

J. A. NARCAVAGE, *Assistant Examiner.*